United States Patent
Chuang

(10) Patent No.: US 8,092,027 B2
(45) Date of Patent: Jan. 10, 2012

(54) PORTABLE ELECTRONIC DEVICE WITH MICRO-PROJECTING MODULE

(76) Inventor: Yi-Fang Chuang, Sanchong (TW)

( * ) Notice: Subject to any disclaimer, the term of this patent is extended or adjusted under 35 U.S.C. 154(b) by 301 days.

(21) Appl. No.: 12/418,756

(22) Filed: Apr. 6, 2009

(65) Prior Publication Data

US 2010/0002198 A1   Jan. 7, 2010

(30) Foreign Application Priority Data

Jul. 4, 2008 (TW) ................................ 97211935 U

(51) Int. Cl.
*G03B 21/16* (2006.01)

(52) U.S. Cl. ............... 353/52; 353/39; 353/53; 353/54; 353/55; 353/56; 353/57; 353/58; 353/59; 353/60; 353/61; 353/70; 353/119; 353/122

(58) Field of Classification Search .............. 353/39, 353/52–61, 70, 119, 122; 361/702–704, 361/707, 709, 717–719, 722; 165/804, 168; D16/200–205, 221, 225, 230, 231, 23, 514
See application file for complete search history.

(56) References Cited

U.S. PATENT DOCUMENTS

| | | | | |
|---|---|---|---|---|
| D343,850 S | * | 2/1994 | Saeki et al. | D16/234 |
| 5,820,242 A | * | 10/1998 | Rodriguez et al. | 353/119 |
| 6,561,655 B2 | * | 5/2003 | Sawai et al. | 353/61 |
| 6,856,506 B2 | * | 2/2005 | Doherty et al. | 361/679.27 |
| 7,556,385 B2 | * | 7/2009 | Kitahara | 353/119 |
| 2006/0157230 A1 | * | 7/2006 | Kawahara et al. | 165/104.33 |
| 2006/0290893 A1 | * | 12/2006 | Lim et al. | 353/57 |
| 2007/0115438 A1 | * | 5/2007 | Tsubura | 353/57 |
| 2008/0018863 A1 | * | 1/2008 | Hsiao | 353/54 |
| 2008/0225243 A1 | * | 9/2008 | Chen et al. | 353/119 |
| 2009/0161078 A1 | * | 6/2009 | Wu et al. | 353/57 |

* cited by examiner

*Primary Examiner* — Georgia Y Epps
*Assistant Examiner* — Sultan Chowdhury
(74) *Attorney, Agent, or Firm* — Chun-Ming Shih; HDLS IPR Services

(57) ABSTRACT

A portable electronic device with micro-projecting module includes a shell body, a micro-projecting module, a heat-conducting plate and a supporting stand. The shell body has a front lateral plate and a bottom lateral plate adjoining the front lateral plate. The front lateral plate has a front through hole, while the bottom lateral plate has a bottom through hole. The micro-projecting module is arranged in the shell body and has a lens exposing to an outside of the shell body from the front through hole. The heat-conducting plate is arranged in the shell body and is positioned between the micro-projecting module and the bottom through hole. In the meantime, the heat-conducting plate has a heat-absorbing face contacting the micro-projecting module and a heat-dissipating face abutted against the bottom through hole. The supporting stand may be pivoted onto the heat-dissipating face with a closing position substantially parallel to the heat-dissipating face after a rotation and a developing position by rotating a predetermined angle with respect to the heat-dissipating face.

6 Claims, 3 Drawing Sheets

PORTABLE ELECTRONIC DEVICE WITH MICRO-PROJECTING MODULE

BACKGROUND OF THE INVENTION

1. Field of the Invention

The present invention in general relates to a portable electronic device, in particular, to a portable electronic device with micro-projecting module taking LEDs as light source.

2. Description of Prior Art

Following a gradual maturity of LED technology and a gradual micronization of micro-projecting module, it gradually becomes undifficult to adopt LEDs as a light source of the micro-projecting module integrated with a portable electronic device.

In order to project out an image clearly, LEDs with high power must be adopted in the aforementioned micro-projecting module to provide a light beam with sufficient brightness. However, during the meantime when the brightness of the light beam is notably increased, the micro-projecting module also faces a heating problem arisen from the LEDs, so an appropriate heat-dissipating device has to be designed to effectively expel the heat generated from the LEDs. Otherwise, the brightness and the lifespan of the LEDs will be influenced.

In addition, since the light beam of the image projected from the projecting device has a diffusive angle if, when it is necessary to place the projecting device horizontally on desk's surface to project images, then a part of the light beam of the image will be cast onto the desk's surface, usually, a heightening article is needed to be inserted under the lens part of the projecting device, making the projecting device shown as an inclined position to raise the projecting angle, such that the light beam of the image can be entirely projected out without the hindrance of the desk's surface. However, the way to insert a heightening article under the lens part is very inconvenient. Besides, it is sometimes very difficult to find a heightening article with appropriate height in time of emergency and in terms of practical use.

Therefore, how to improve and solve the aforementioned problems is an issue intended to be addressed by the inventor.

Accordingly, after a substantially devoted study, in cooperation with the application of relatively academic principles, the inventor has finally proposed the present invention that is designed reasonably to possess the capability to improve the drawback of the prior art significantly.

SUMMARY OF THE INVENTION

The invention is mainly to provide a portable electronic device with micro-projecting module, which not only can undergo a heat-dissipating task to the LEDs of the micro-projecting module, but also can raise the projecting angle without using a heightening article.

Secondly, the invention is to provide a portable electronic device with micro-projecting module, including a shell body, a micro-projecting module, a heat-conducting plate and a supporting stand. The shell body has a front lateral plate and a bottom lateral plate adjoining the front lateral plate. The front lateral plate has a front through hole, while the bottom lateral plate has a bottom through hole. The micro-projecting module is arranged in the shell body and has a lens exposing to an outside of the shell body from the front through hole. The heat-conducting plate is arranged in the shell body and is positioned between the micro-projecting module and the bottom through hole. In the meantime, the heat-conducting plate has a heat-absorbing face contacting the micro-projecting module and a heat-dissipating face abutted against the bottom through hole. The supporting stand may be pivoted onto the heat-dissipating face in a rotary manner with a closing position substantially parallel to the heat-dissipating face and a developing position by rotating a predetermined angle with respect to the heat-dissipating face.

By arranging a heat-conducting plate between the micro-projecting module and the bottom through hole, the invention can dissipate the heat generated from the LEDs of the micro-projecting module to the ambience. In the invention, the heat-conducting plate may make a heat exchange with the ambience through the bottom through hole, avoid influencing the brightness and lifespan of the LEDs. Furthermore, when the supporting stand is rotated to a developing position, the lens can be hold up from the placing surface during using period, so the portable electronic device with micro-projecting module is shown as an inclined configuration with an increase of projecting angle, making the light beam of the image clearly and entirely projected out without any hindrance.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, not used to limit its executing scope. Any equivalent variation and modification made according to appended claims is all covered by the claims claimed by the present invention.

Figure 1:
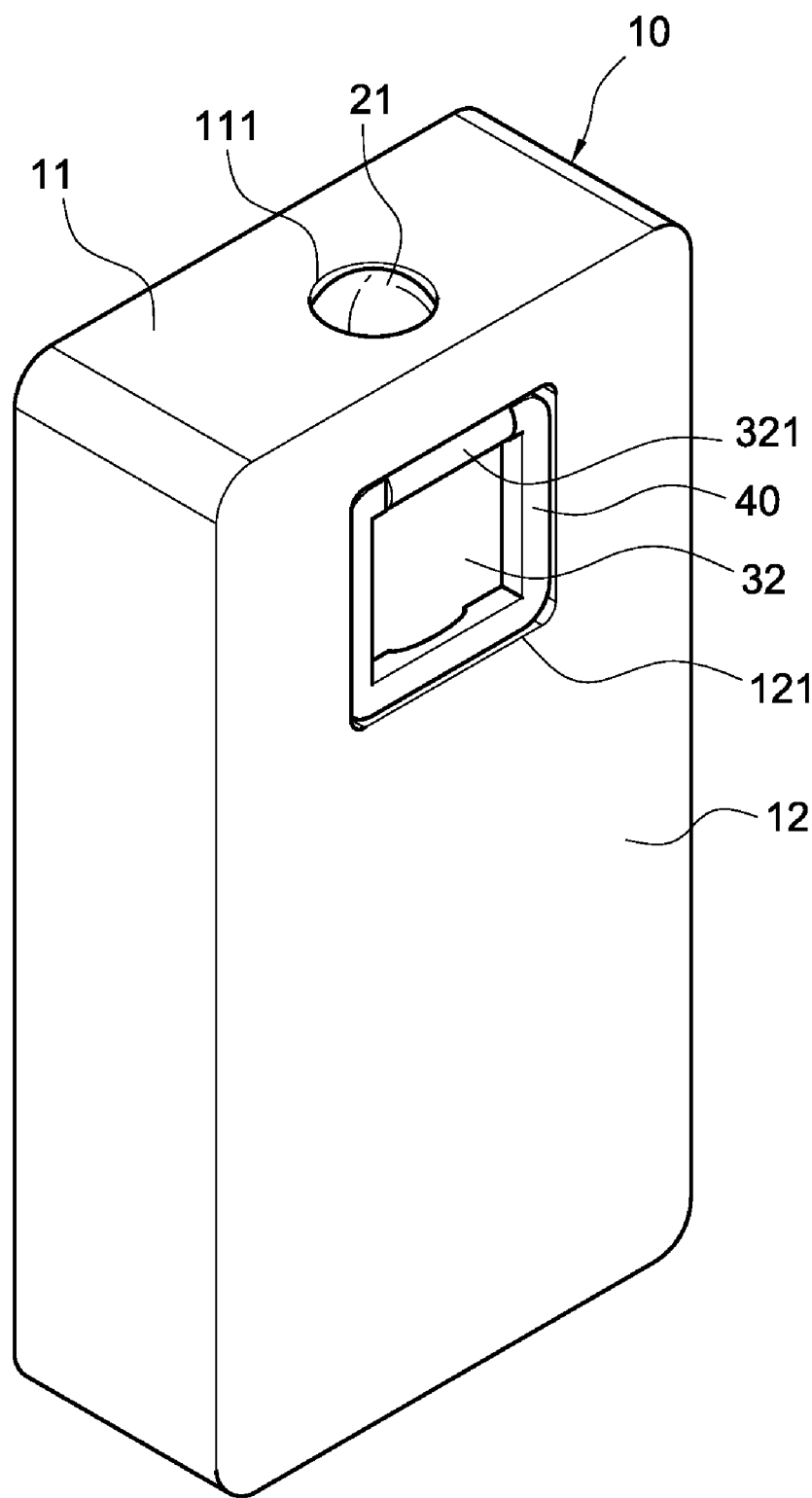
FIG. 1 is a perspective illustration of a portable electronic device with micro-projecting module according to a preferable embodiment of the present invention.
Figure 2:
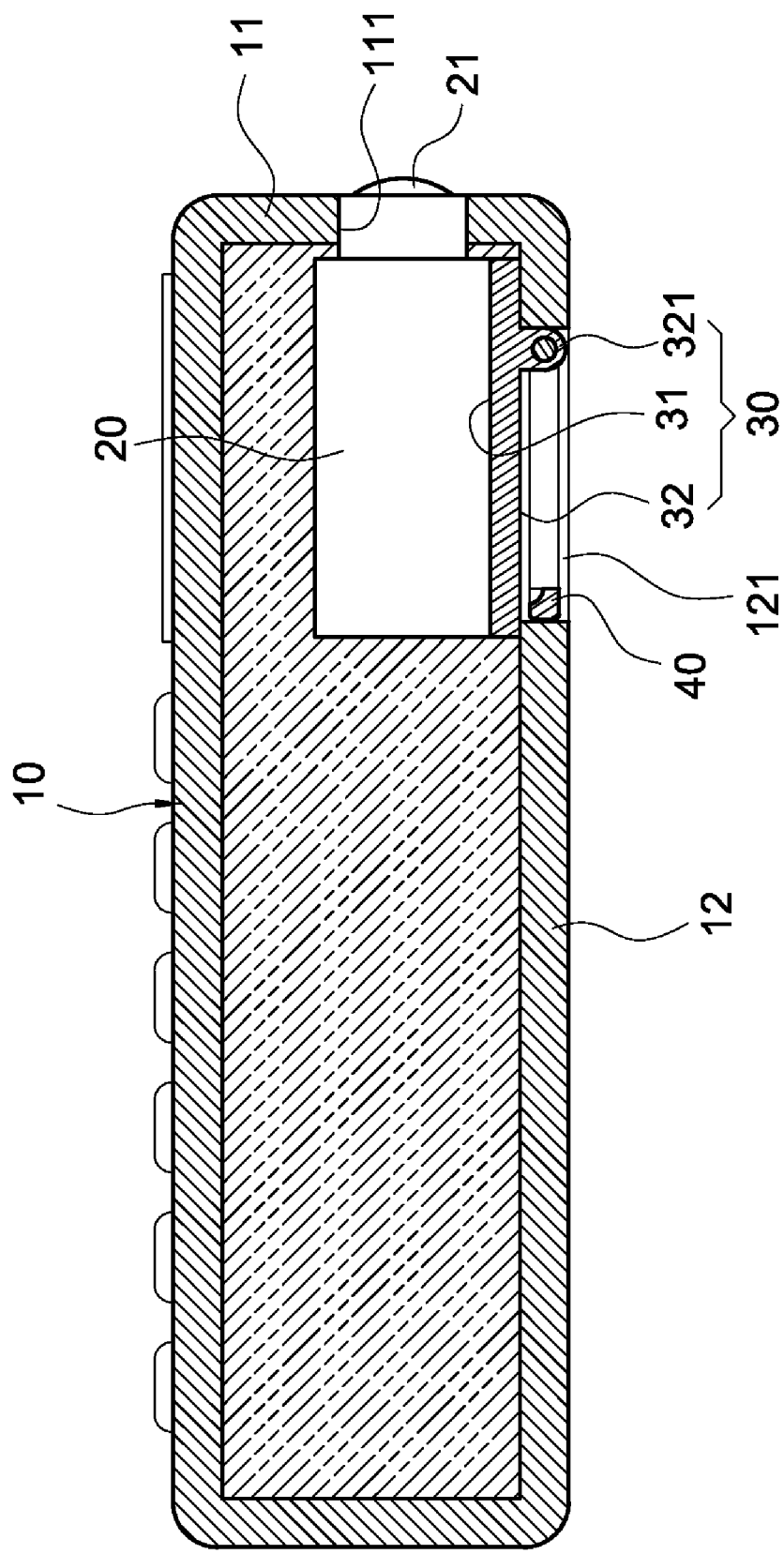
FIG. 2 is a cross-sectional view of a portable electronic device with micro-projecting module in FIG. 1.

Please refer to FIG. 1 and FIG. 2, showing a portable electronic device with micro-projecting module according to a preferable embodiment of the present invention, including a shell body 10, a micro-projecting module 20, a heat-conducting plate 30 and a supporting plate 40.

The shell body 10 substantially shown as a cuboid has a front lateral plate 11 and a bottom lateral plate 12 substantially vertical to the front lateral plate 11. The front lateral plate 11 has a front through hole 111, while the bottom lateral plate 12 has a bottom through hole 121. In so doing, the bottom through hole 121 is positioned at one side of the bottom lateral plate 12 adjoining to the front lateral plate 11.

The micro-projecting module 20 arranged in the shell body 10 has a lens 21 exposing to an outside of the shell body 10 from the front through hole 111. In this embodiment, the micro-projecting module 20 has at least one LED (not shown) providing a light source.

The heat-conducting plate 30 arranged in the shell body 10 is positioned between the micro-projecting module 20 and the bottom through hole 121. The heat-conducting plate 30 is made of a metallic material with excellent thermal conductivity, such as copper and aluminum. The heat-conducting plate 30 is comprised of a heat-absorbing face 31 contacting the micro-projecting module 20 and a heat-dissipating face 32 opposite to the heat-absorbing face 31 and abutted against the bottom through hole 121. Furthermore, a pivoting part 321 projected from the heat-dissipating face 32 is provided for pivoting the supporting stand 40.

In this case, by arranging the heat-conducting plate 30 between the micro-projecting module 20 and the bottom through hole 121, it is possible to expel the heat generated from the LEDs of the micro-projecting module 20. More specifically, the heat-conducting plate 30 may make a heat exchange with the ambience through the bottom through hole 121, avoid influencing the brightness and the lifespan of the LEDs.

Figure 3:
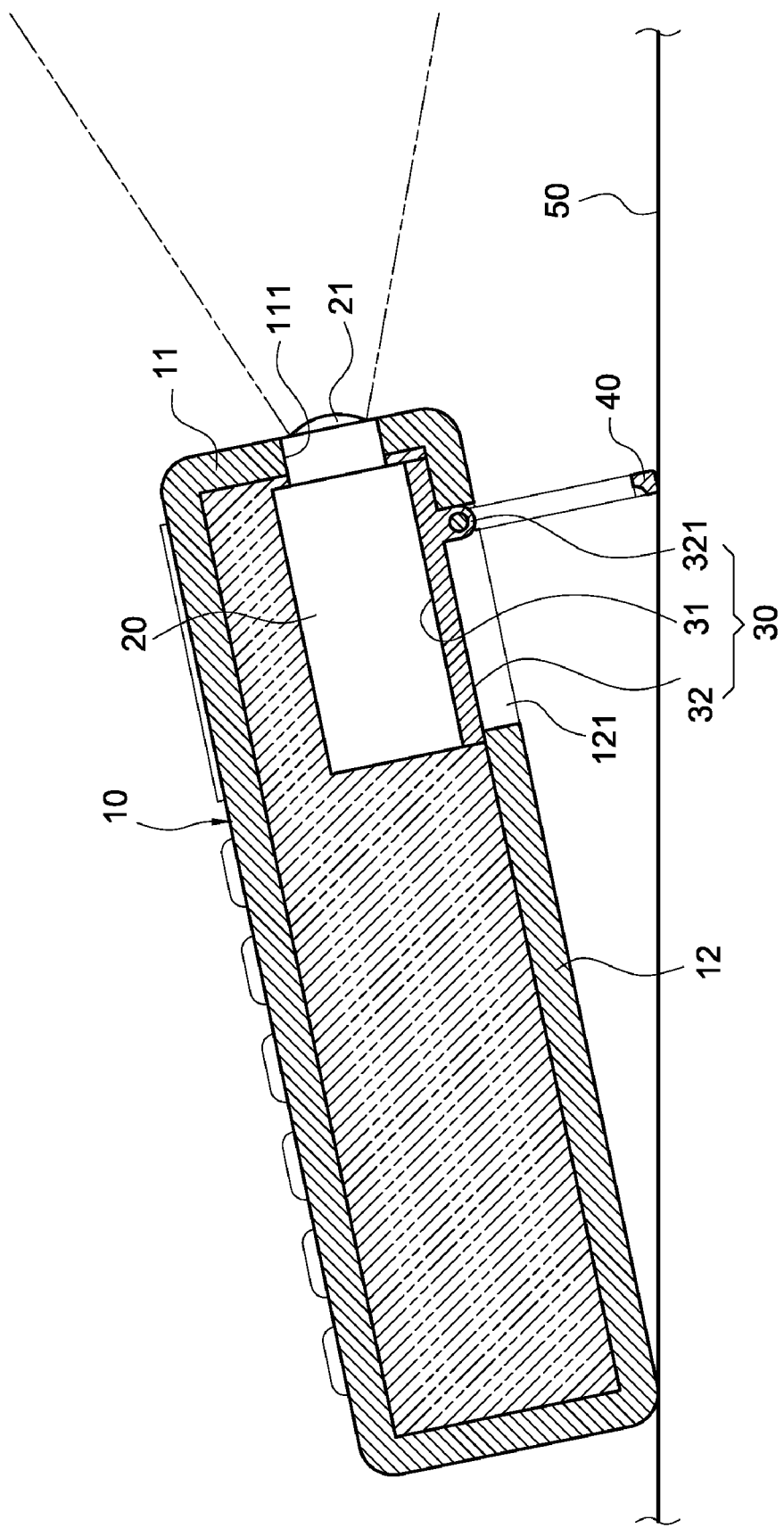
FIG. 3 is a cross-sectional view of a supporting stand, at a developing position, of a portable electronic device with micro-projecting module in FIG. 2.

As shown in FIG. 2 and FIG. 3, the supporting stand 40 is pivoted to the pivoting part 321 of the heat-dissipating face 32 in a rotary manner. The supporting stand 40 is made of a metallic material with an excellent thermal conductivity, such as copper and aluminum. The supporting stand 40 has a closing position substantially parallel to the heat-dissipating face 32 (FIG. 2) and a developing position with a predetermined angle with respect to the heat-dissipating face 32 through a rotary manner. Furthermore, when in a closing position, the supporting stand 40 may be accommodated in the bottom through hole 121, avoid being exposed to an outside of the bottom lateral plate 12 and keeping the flatness of the bottom lateral plate 12. When in a developing position, the supporting stand 40 has a predetermined angle substantially vertical to the heat-dissipating face 32, however, not limited to this only.

By rotating the supporting stand 40 pivoted the heat-dissipating face 32 to a developing position, it is possible that, when in use, the lens 21 is hold up from the placing surface 50 (for example, a desk's surface), the portable electric device with micro-projecting module is shown as an inclined configuration by raising the projecting angle. In the meantime, the light beam of the image projected from the micro-projecting module 20 may be entirely projected out without the hindrance of the placing surface 50. In addition, the heat generated form the LEDs of the micro-projecting module 20 may be further conducted to the supporting stand 40 through the pivoting part 321 of the heat-conducting plate 30, where the heat-dissipating area provided by the supporting stand 40 may further enhance the effect of heat dissipation.

Summarizing aforementioned description, the micro-projecting module according to the invention is an indispensably novel device for a portable electronic device indeed, which may positively reach the expected usage objective for solving the drawbacks of the prior arts, and which extremely possesses the innovation and progressiveness to completely fulfill the applying merits of new type patent, according to which the invention is thereby applied. Please examine the application carefully and grant it as a formal patent for protecting the rights of the inventor.

However, the aforementioned description is only a preferable embodiment according to the present invention, not used to limit the patent scope of the invention, so equivalently structural variation made to the contents of the present invention, for example, description and drawings, is all covered by the claims claimed thereinafter.

What is claimed is:

1. A portable electronic device with micro-projecting module, including:
    a shell body, which has a front lateral plate and a bottom lateral plate adjoining the front lateral plate, the front lateral plate having a front through hole, while the bottom lateral plate has a bottom through hole;
    a micro-projecting module, which is arranged in the shell body and has a lens exposing to an outside of the shell body from the front through hole;
    a heat-conducting plate, which is arranged in the shell body and is positioned between the micro-projecting module and the bottom through hole, and which has a heat-absorbing face contacting the micro-projecting module and a heat-dissipating face abutted against the bottom through hole;
    a supporting stand, which may be pivoted onto the heat-dissipating face with a closing position substantially parallel to the heat-dissipating face after a rotation and a developing position by rotating a predetermined angle with respect to the heat-dissipating face; and
    a pivoting part projected from and in thermal connectivity with the heat-conducting plate, wherein the pivoting part is provided for pivoting the supporting stand and for placing the supporting stand in thermal connectivity with the heat-conducting plate.

2. The portable electronic device with micro-projecting module according to claim 1, wherein the bottom through hole is positioned at one side of the bottom lateral plate adjoining to the front lateral plate.

3. The portable electronic device with micro-projecting module according to claim 1, wherein the heat-conducting plate is made of a metallic material.

4. The portable electronic device with micro-projecting module according to claim 1, wherein the supporting stand is made of a metallic material.

5. The portable electronic device with micro-projecting module according to claim 4, wherein the supporting stand may be accommodated in the bottom through hole.

6. The portable electronic device with micro-projecting module according to claim 1, wherein the predetermined angle is substantially a vertical angle.

* * * * *